(12) United States Patent
George et al.

(10) Patent No.: US 9,022,287 B1
(45) Date of Patent: May 5, 2015

(54) SHOPPING SYSTEM FOR TRACKING AND TABULATING COSTS

(71) Applicants: Mercedes M. George, Holly Ridge, NC (US); Silver George, Ahoskie, NC (US)

(72) Inventors: Mercedes M. George, Holly Ridge, NC (US); Silver George, Ahoskie, NC (US)

(*) Notice: Subject to any disclaimer, the term of this patent is extended or adjusted under 35 U.S.C. 154(b) by 0 days.

(21) Appl. No.: 14/167,578

(22) Filed: Jan. 29, 2014

(51) Int. Cl.
*G06K 15/00* (2006.01)
*G06Q 30/06* (2012.01)
*G06F 15/02* (2006.01)
*B62B 3/02* (2006.01)
*G06F 15/10* (2006.01)

(52) U.S. Cl.
CPC ........ *G06Q 30/0633* (2013.01); *G06Q 30/0641* (2013.01); *G06F 15/0216* (2013.01); *B62B 3/02* (2013.01); *G06F 15/10* (2013.01)

(58) Field of Classification Search
USPC ................................................ 235/375, 383
See application file for complete search history.

(56) References Cited

U.S. PATENT DOCUMENTS

| 4,685,701 A * | 8/1987 | Amundson et al. ............. 281/42 |
| 4,929,819 A | 5/1990 | Collins, Jr. |
| 5,424,524 A | 6/1995 | Ruppert et al. |
| 5,566,609 A * | 10/1996 | Kirschner ....................... 108/42 |
| 5,637,847 A | 6/1997 | Watanabe |
| 5,821,512 A * | 10/1998 | O'Hagan et al. .............. 235/383 |
| D417,885 S | 12/1999 | Boutin |
| 6,484,939 B1 | 11/2002 | Blaeuer |
| 2014/0069973 A1* | 3/2014 | Peck et al. .................... 224/411 |

* cited by examiner

Primary Examiner — Christle I Marshall

(57) ABSTRACT

A shopping system for tracking and tabulating costs during a shopping experience features a shopping cart with a handle having a handle diameter and a horizontal support bar having a horizontal support bar diameter. The system features a computing unit with a power supply and a microprocessor located inside. The computing unit features input keys located on a computing unit top that are in communication with the microprocessor for data input. The computing unit features a first display and a second display located on the computing unit top. Data input from the input keys is displayed on the first display. The computing unit features a scanner located on a computing unit front. Data read by the scanner is displayed on the second display. The system features a first clip and a second clip located on a computing unit bottom.

5 Claims, 4 Drawing Sheets (TOP VIEW)

(BOTTOM VIEW)

(FRONT VIEW)

SHOPPING SYSTEM FOR TRACKING AND TABULATING COSTS

FIELD OF THE INVENTION

The present invention relates to shopping shopping system for tracking and tabulating costs.

BACKGROUND OF THE INVENTION

Sometimes when shopping, it can be easy to accumulate too many items to purchase when trying to stick to a budget because the difficulty of keeping track of the accumulated costs. Further, it can be difficult to determine the price of an item in a store if it is unmarked, especially when no barcode scanners are nearby. The present invention features a shopping system for tracking and tabulating costs during a shopping experience.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY OF THE INVENTION

The present invention features a shopping system for tracking end tabulating costs during a shopping experience. In some embodiments, the system comprises a shopping cart. In some embodiments, the shopping cart comprises a handle having a handle diameter and a horizontal support bar having a horizontal support bar diameter.

In some embodiments, the system comprises a computing unit. In some embodiments, the computing unit comprises a power supply and a microprocessor located inside. In some embodiments, the computing unit comprises input keys located on a computing unit top. In some embodiments, the input keys are in communication with the microprocessor for data input.

In some embodiments, the computing unit comprises a first display and a second display located on the computing unit top. In some embodiments, data input from the input keys is displayed on the first display. In some embodiments, the computing unit comprises a scanner located on the computing unit front. In some embodiments, data read by the scanner is displayed on the second display. In some embodiments, the system comprises a first clip and a second clip located on the computing unit bottom.

DESCRIPTION OF PREFERRED EMBODIMENTS

Figure 1:
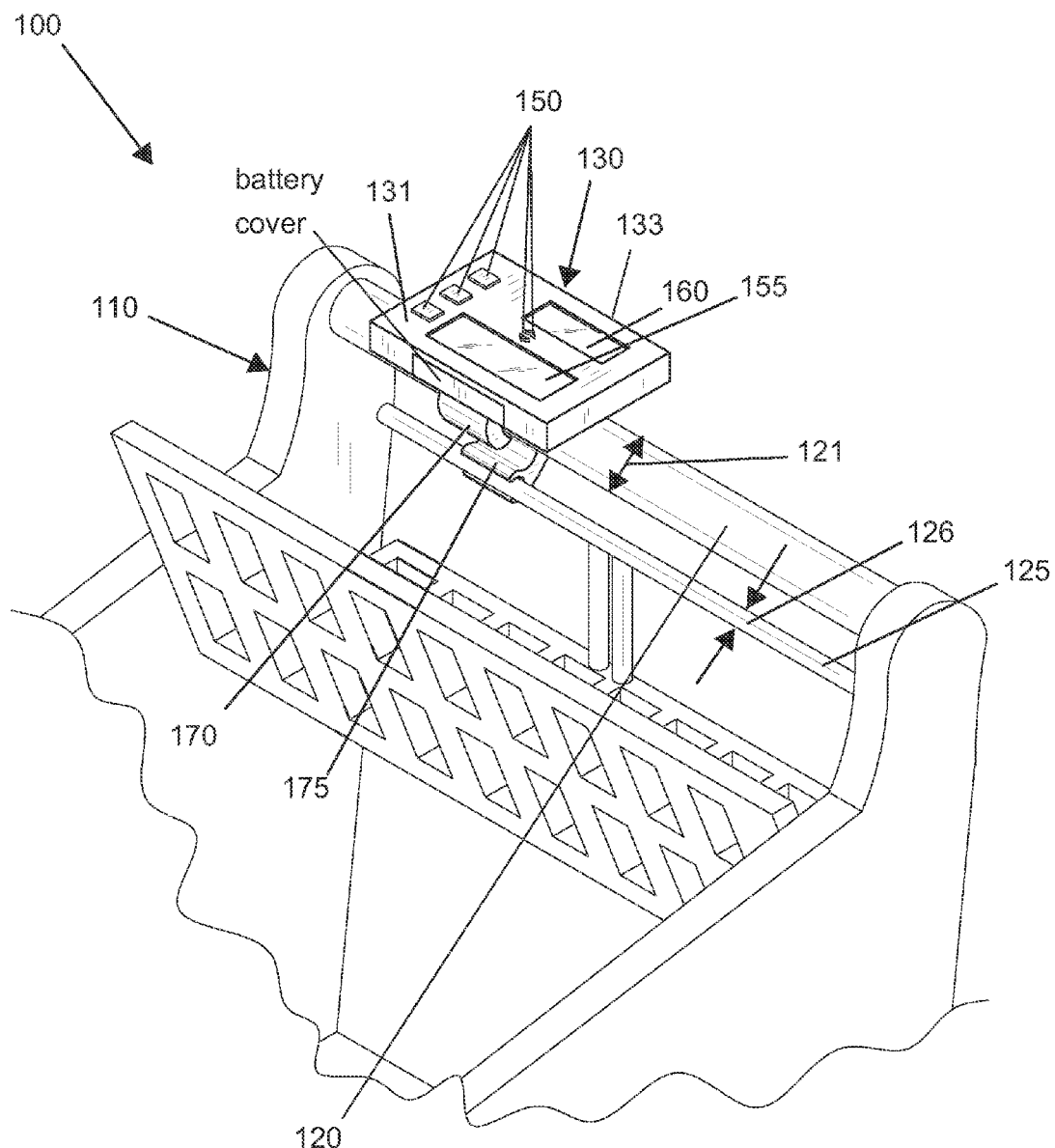
FIG. 1 shows a perspective view of the present invention.
Figure 2:
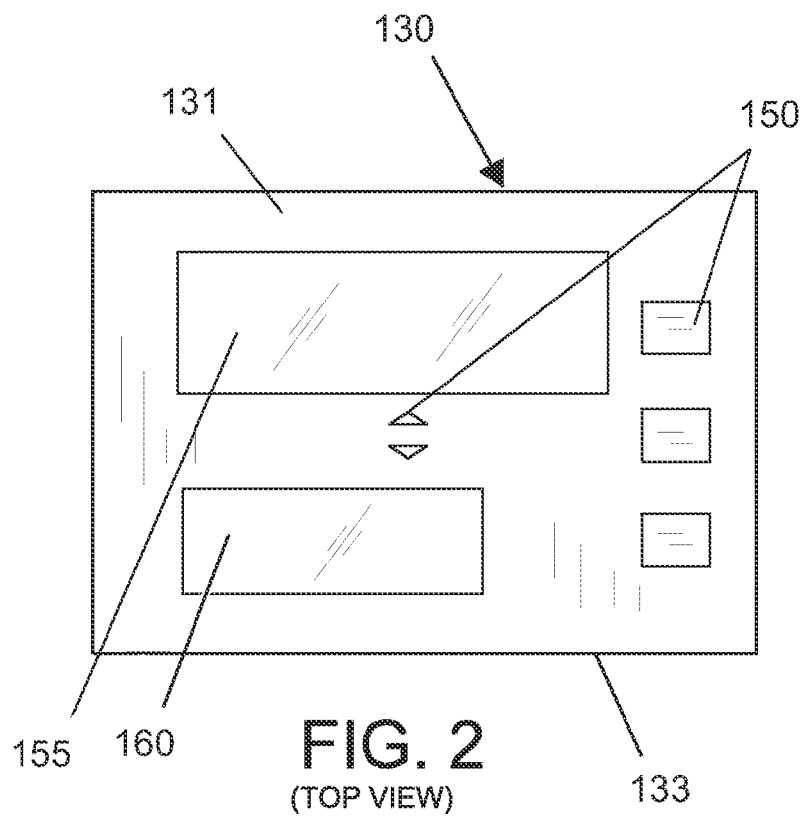
FIG. 2 shows a top view of the computing unit of the present invention.
Figure 3:
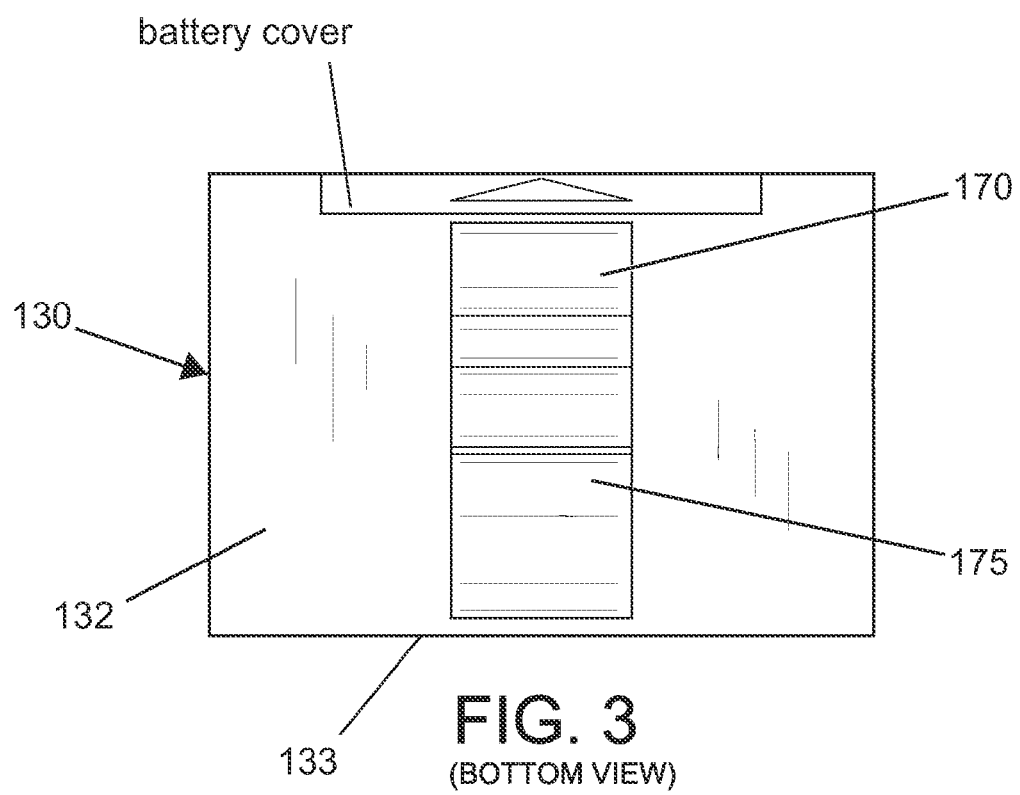
FIG. 3 shows a bottom view of the computing unit of the present invention.
Figure 4:
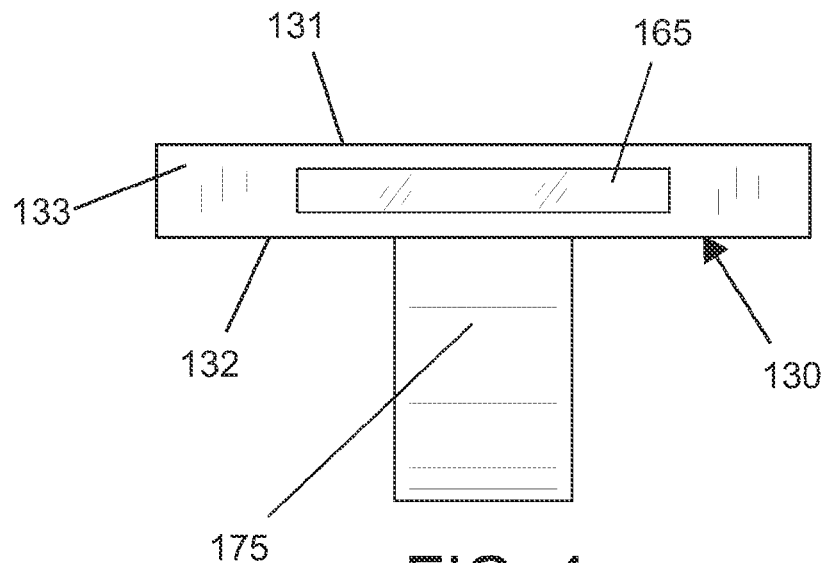
FIG. 4 shows a front view of the computing unit of the present invention.
Figure 5:
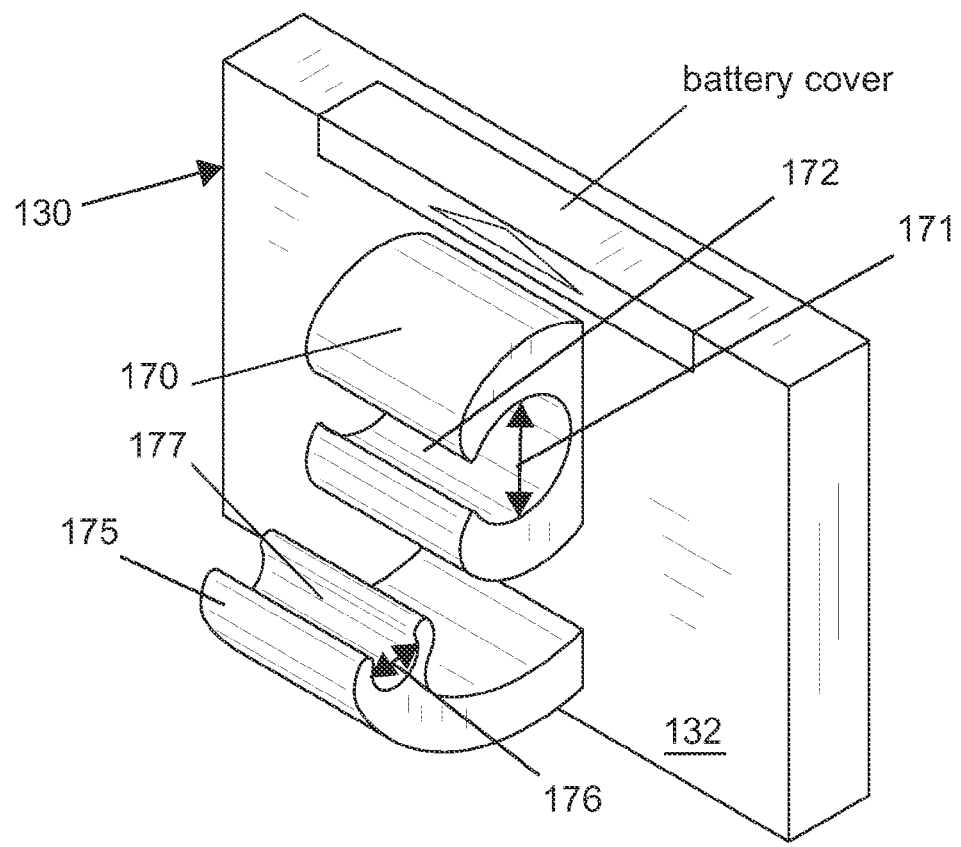
FIG. 5 shows a perspective view of the computing unit bottom of the present invention.
Figure 6:
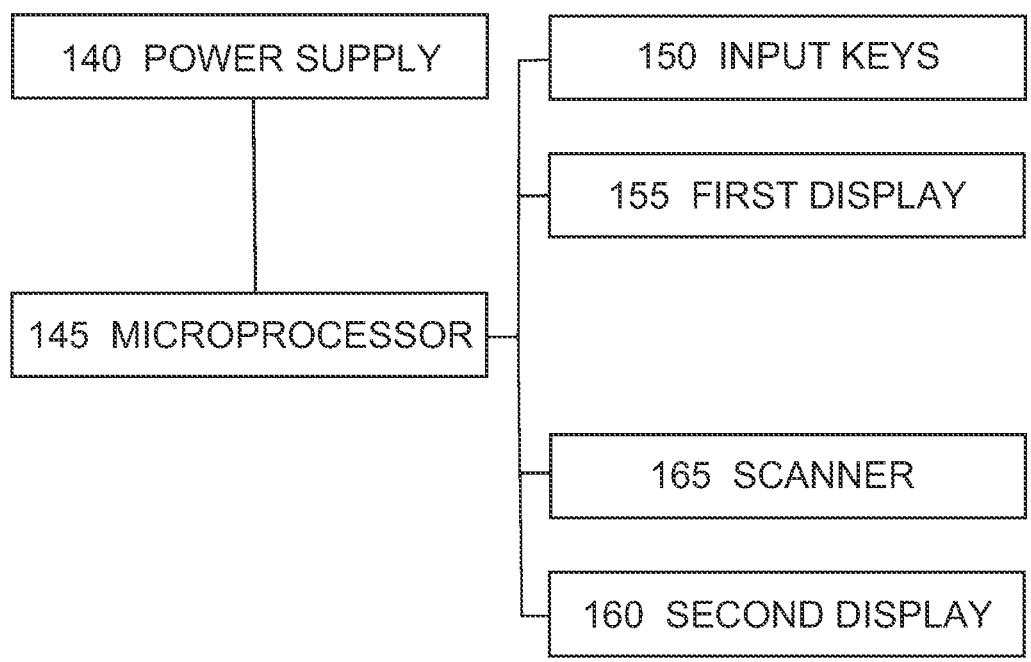
FIG. 6 shows a schematic view of the present invention.

Following is a list of elements corresponding to a particular element referred to herein:

100 Shopping system
110 Shopping cart
120 Handle
121 Handle diameter
125 Horizontal support bar
126 Horizontal support bar diameter
130 Computing unit
131 Computing unit top
132 Computing unit bottom
133 Computing unit front
140 Power supply
145 Microprocessor
150 Input keys
155 First display
160 Second display
165 Scanner
170 First clip
171 First clip inner diameter
172 First clip opening
175 Second clip
176 Second clip inner diameter
177 Second clip opening Referring now to FIGS. 1-6, the present invention features a shopping system (100) for tracking and tabulating costs during a shopping experience. In some embodiments, the system (100) comprises a shopping car (110). In some embodiments, the shopping cart (110) comprises a handle (120) having a handle diameter (121) and a horizontal support bar (125) having a horizontal support bar diameter (126). In some embodiments, the horizontal support bar (125) is located below and offset from the handle. In some embodiments, the handle (120) and the horizontal support bar (125) are round.

In some embodiments, the system (100) a computing unit (130) having a computing unit top (131), a computing unit bottom (132), and a computing unit front (133). In some embodiments, the computing unit (130) comprises a power supply (140) located therein. In some embodiments, the computing unit (130) comprises a microprocessor (145) located therein operatively connected to the power supply (140). In some embodiments, the power supply (140) is a battery.

In some embodiments, the computing unit (130) comprises input keys (150) located on a computing unit top (131). In some embodiments, the input keys (150) are in communication with the microprocessor (145) for data input.

In some embodiments, the computing unit (130) comprises a first display (155) and a second display (160) located on the computing unit top (131). In some embodiments, the first display (155) is operatively connected to the microprocessor (145). In some embodiments, data input from the input keys (150) is displayed on the first display (155). In some embodiments, output from the microprocessor (145) is displayed on the first display (155). In some embodiments, the second display (160) is operatively connected to the microprocessor (145). In some embodiments, the first input display (155) and the second input display (160) are liquid crystal displays. In some embodiments, the first input display (155) and the second input display (160) are two entirely separate displays that are not combined. In some embodiments, the first input display (155) and the second input display (160) are touch screen displays.

In some embodiments, the computing unit (130) comprises a scanner located on the computing unit front (133). In some embodiments, the scanner is operatively connected to the microprocessor (145). In some embodiments, only data read by the scanner is displayed on the second display (160). In some embodiments, data read by the scanner is only displayed on the second display (160).

In some embodiments, the system (100) comprises a first clip (170) located on the computing unit bottom (132). In some embodiments, the first clip (170) is adapted to snap onto the handle (120). In some embodiments, a first clip inner diameter (171) is equal to the handle diameter (121). In some embodiments, the first clip (170) comprises a first clip opening (172). In some embodiments, the first clip opening (172) opens away from and perpendicularly opposite from the computing unit bottom (132). In some embodiments, the handle (120) is insertable into the first clip (170) only from the direction that is perpendicular to the computing unit bottom (132). In some embodiments, the first clip (170) rotates about the handle (120).

In some embodiments, the system (100) comprises a second clip (175) located on the computing unit bottom (132). In some embodiments, the second clip (175) is adapted to snap onto the horizontal support bar (125). In some embodiments, a second clip inner diameter (176) is equal to the horizontal support bar diameter (126). In some embodiments, the second clip (175) comprises a second clip opening (177). In some embodiments, the second clip opening opens perpendicular to the opening on the first clip (170). In some embodiments, the horizontal support bar (125) is insertable into the second clip (175) only from a direction that is parallel to the computing unit bottom (132). In some embodiments, the first clip (170) rotates about the handle (120) unit the second clip (175) is snapped onto the horizontal support bar (125). In some embodiments, the second clip opening (177) faces the same direction as a computing unit back (opposed to the computing unit front (133)).

In some embodiments, the system (100) comprises a first clip (170) located on the computing unit bottom (132). In some embodiments, the first clip (170) is adapted to snap onto the handle (120). In some embodiments, a first clip inner diameter (171) is equal to the handle diameter (121). In some embodiments, the first clip (170) comprises an opening opposite the computing unit (130). In some embodiments, the first clip (170) rotates about the handle (120). In some embodiments, the first clip (170) is located proximal to a computing unit rear opposite the computing unit front (133) shifting the computing unit toward a user.

In some embodiments, the system (100) comprises a second clip (175) located on the computing unit bottom (132). In some embodiments, the second clip (175) is adapted to snap onto the horizontal support bar (125). In some embodiments, a second clip inner diameter (176) is equal to the horizontal support bar diameter (126). In some embodiments, the second clip (175) comprises an opening perpendicular to the opening on the first clip (170). In some embodiments, the first clip (170) rotates about the handle (120) until the second clip (175) is snapped onto the horizontal support bar (125). In some embodiments, the second clip (175) is located proximal to the computing unit front (133).

In some embodiments, data pertaining to the shopping experience is entered into the microprocessor (145) via the input keys (150). In some embodiments, data pertaining to the shopping experience is viewed through the first display (155).

In some embodiments, the scanner is used to read information from an item for input into the microprocessor (145).

In some embodiments, the computing unit top (131) is located on a plane parallel to a ground surface. In some embodiments, the computing unit top (131) is located on a plane 15 degrees from horizontal toward a user (behind the shopping car (110)). In some embodiments, the computing unit top (131) is located on a plane 30 degrees from horizontal toward a user (behind the shopping cart (110)).

In some embodiments, the first clip (170) and the second clip (175) are slidably adjustable with respect to the computing unit bottom (132).

In some embodiments, the power supply (140) is a battery.

In some embodiments, the scanner is an infrared scanner.

As used herein, the term "about" refers to plus or minus 10% of the referenced number.

The disclosures of the following U.S. Patents are incorporated in their entirety by reference herein: U.S. Pat. No. D 417,885; U.S. Pat. No. 6,484,939; U.S. Pat. No. 5,821,512; U.S. Pat. No. 5,637,847; U.S. Pat. No. 5,424,524; and U.S. Pat. No. 4,929,819.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. Reference numbers recited in the claims are exemplary and for ease of review by the patent office only, and are not limiting in any way. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting of", and as such the written description requirement for claiming one or more embodiments of the present invention using the phrase "consisting of" is met.

The reference numbers recited in the below claims are solely for ease of examination of this patent application, and are exemplary, and are not intended in any way to limit the scope of the claims to the particular features having the corresponding reference numbers in the drawings.

What is claimed is:

1. A shopping system (100) for tracking and tabulating costs during a shopping experience, wherein the system (100) comprises:
   (a) a shopping cart (110), wherein the shopping cart (110) comprises a handle (120) having a handle diameter (121) and a horizontal support bar (125) having a horizontal support bar diameter (126), wherein the horizontal support bar (125) is disposed below and offset from the handle (120);
   (b) a computing unit (130) having a computing unit top (131), a computing unit bottom (132), and a computing unit front (133), wherein the computing unit (130) comprises:
      (i) a power supply (140) disposed therein,
      (ii) a microprocessor (145) disposed therein operatively connected to the power supply (140),
      (iii) input keys (150) disposed on a computing unit top (131), wherein the input keys (150) are in communication with the microprocessor (145) for data input,
      (iv) a first display (155) and a second display (160) disposed on the computing unit top (131), wherein the first display (155) is operatively connected to the microprocessor (145), wherein data input from the input keys (150) is displayed on the first display (155), wherein the second display (160) is operatively connected to the microprocessor (145), and (v) a scanner disposed on the computing unit front (133), wherein the scanner is operatively connected to the microprocessor (145), wherein data read by the scanner is displayed on the second display (160), (c) a first clip (170) disposed on the computing unit bottom (132), wherein the first clip (170) is adapted to snap onto the handle (120), wherein a first clip inner diameter (171) is equal to the handle diameter (121), wherein the first clip (170) comprises a first clip opening (172), wherein the first clip opening (172) opens away from and perpendicularly opposite from the computing unit bottom (132), wherein the handle (120) is insertable into the first clip (170) only from the direction that is perpendicular to the computing unit bottom (132), wherein the first clip (170) rotates about the handle (120); and (d) a second clip (175) disposed on the computing unit bottom (132), wherein the second clip (175) is adapted to snap onto the horizontal support bar (125), wherein a second clip inner diameter (176) is equal to the horizontal support bar diameter (126), wherein the second clip (175) comprises a second clip opening (177), wherein the second clip opening opens perpendicular to the opening on the first clip (170), wherein the horizontal support bar (125) is insertable into the second clip (175) only from a direction that is parallel to the computing unit bottom (132), wherein the first clip (170) rotates about the handle (120) until the second clip (175) is snapped onto the horizontal support bar (125);

wherein data pertaining to the shopping experience is entered into the microprocessor (145) via the input keys (150), wherein data pertaining to the shopping experience is viewed through the first display (155), wherein the scanner is used to read information from an item for input into the microprocessor (145).

2. The system (100) of claim 1, wherein the computing unit top (131) is disposed on a plane parallel to a ground surface.

3. The system (100) of claim 1, wherein the first clip (170) and the second clip (175) are slidably adjustable with respect to the computing unit bottom (132).

4. The system (100) of claim 1, wherein the power supply (140) is a battery.

5. The system (100) of claim 1, wherein the scanner (165) is an infrared scanner.

\* \* \* \* \*